United States Patent
Maruyama

(10) Patent No.: US 6,191,889 B1
(45) Date of Patent: Feb. 20, 2001

(54) OBJECTIVE LENS FOR OPTICAL PICK-UP

(75) Inventor: Koichi Maruyama, Saitama-ken (JP)

(73) Assignee: Asahi Kogaku Kogyo Kabushiki Kaisha, Tokyo (JP)

(*) Notice: Under 35 U.S.C. 154(b), the term of this patent shall be extended for 0 days.

(21) Appl. No.: 09/321,544

(22) Filed: May 28, 1999

(30) Foreign Application Priority Data

May 29, 1998 (JP) .................................. 10-150361

(51) Int. Cl.[7] .......................... G02B 05/18; G02B 27/44; G02B 03/02
(52) U.S. Cl. .......................... 359/566; 359/565; 359/718; 359/719
(58) Field of Search .................... 359/565, 743, 359/566, 569, 708, 718, 719, 742

(56) References Cited

U.S. PATENT DOCUMENTS

| | | | |
|---|---|---|---|
| 4,815,059 | 3/1989 | Nakayama et al. | 369/45 |
| 5,629,799 | 5/1997 | Maruyama et al. | 359/565 |
| 5,633,852 | 5/1997 | Maruyama et al. | 369/112 |
| 5,796,520 | * 8/1998 | Maruyama | 359/565 |
| 5,838,496 | 11/1998 | Maruyama et al. | 359/565 |
| 5,883,744 | 3/1999 | Maruyama | 359/565 |
| 5,914,822 | * 6/1999 | Maruyama | 359/743 |

FOREIGN PATENT DOCUMENTS

| | | |
|---|---|---|
| 0840144 | 5/1998 | (EP) . |
| 11-337818 | * 10/1999 | (JP) . |

* cited by examiner

*Primary Examiner*—Ricky Mack
(74) *Attorney, Agent, or Firm*—Greenblum & Bernstein, P.L.C.

(57) ABSTRACT

An objective lens includes a refractive lens having a positive refractive power, and a diffractive grating having a plurality of concentric ring-shaped steps that are formed on at least one lens surface of the refractive lens. The objective lens is a biconvex plastic lens of which first and second surfaces are aspherical. A diffractive grating is formed on the first surface of the objective lens. The diffractive grating is similar to a Fresnel lens, it is formed as many concentric rings each of which has a wedge sectional shape. The boundary between the adjacent rings is a step to give a predetermined optical path difference. The diffractive grating has wavelength dependence such that spherical aberration varies in the undercorrected direction as wavelength of incident light increases.

7 Claims, 15 Drawing Sheets

FIG. 1A
FIG. 1B
FIG. 1C
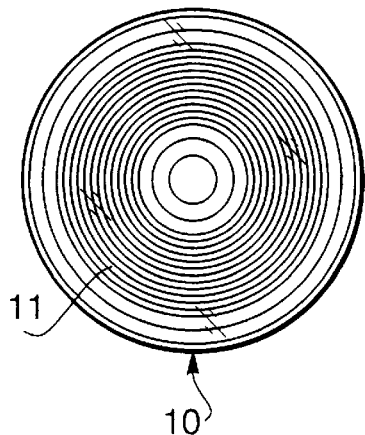
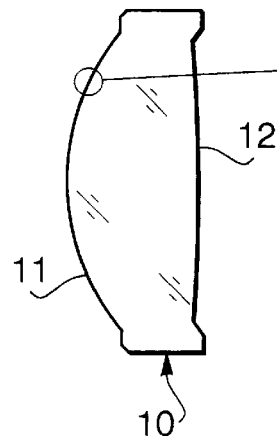
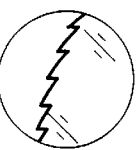
FIG. 2
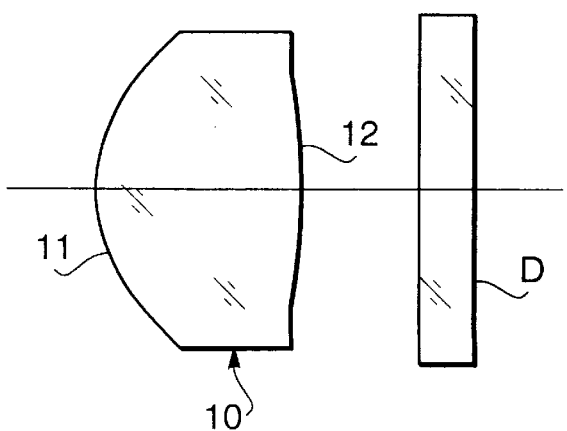

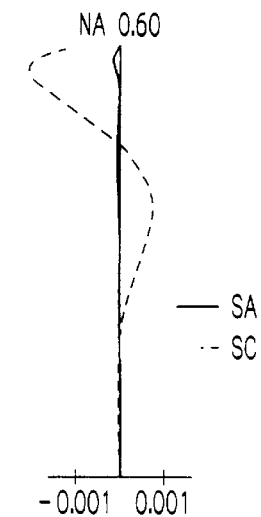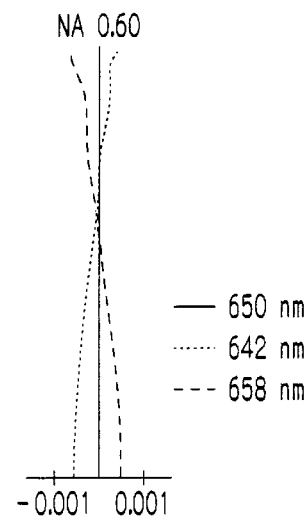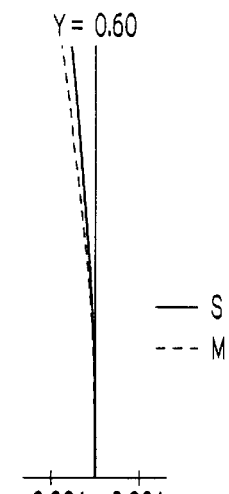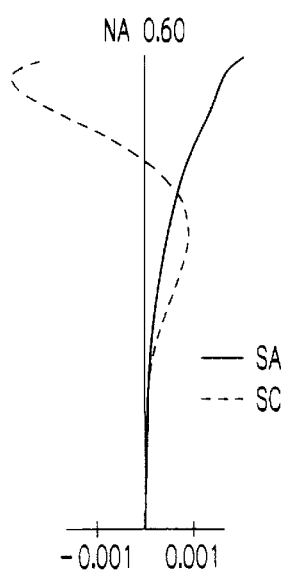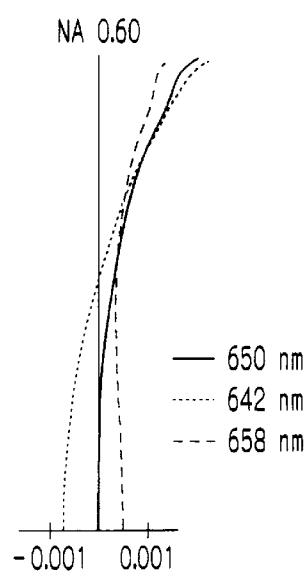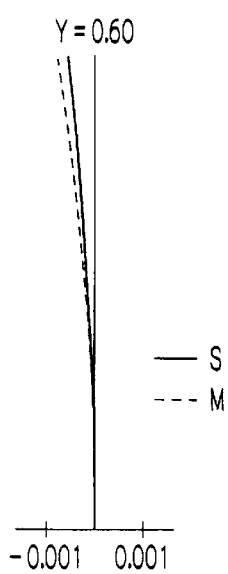

SPHERICAL ABERRATION
SINE CONDITION

SPHERICAL ABERRATION
CHROMATIC ABERRATION

ASTIGMATISM

SPHERICAL ABERRATION
SINE CONDITION

SPHERICAL ABERRATION
CHROMATIC ABERRATION

ASTIGMATISM

SPHERICAL ABERRATION
SINE CONDITION

SPHERICAL ABERRATION
CHROMATIC ABERRATION

ASTIGMATISM

FIG. 11
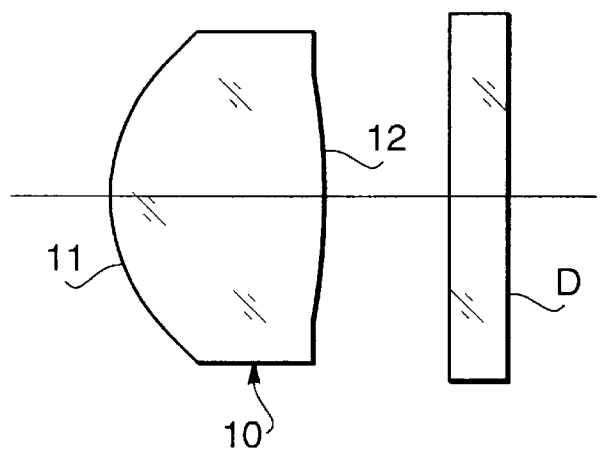
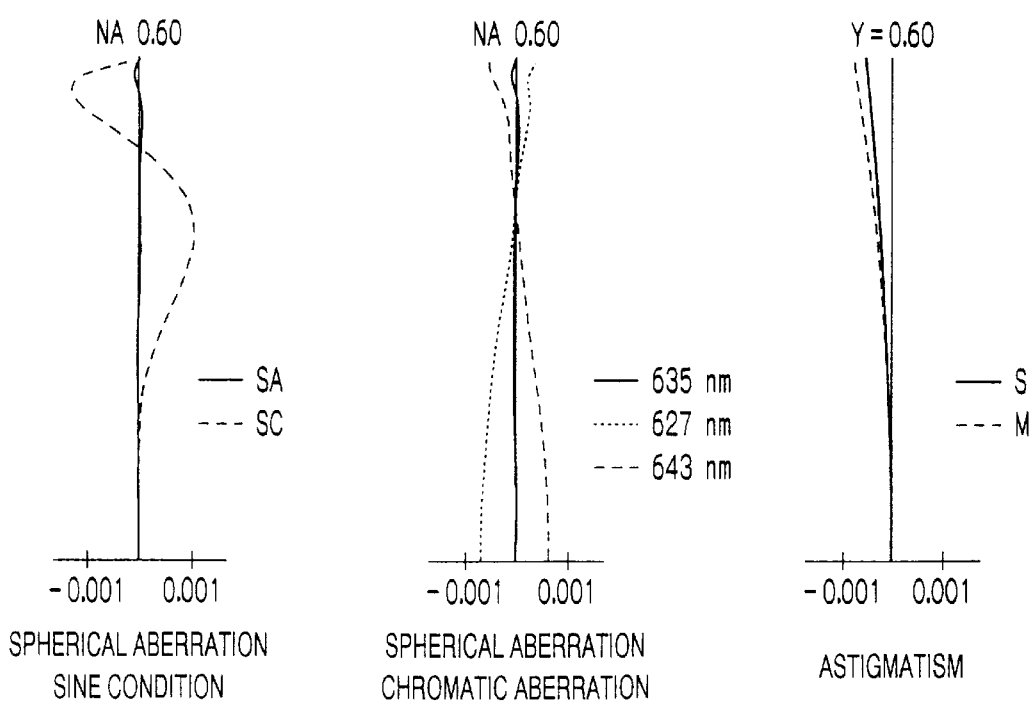
FIG. 12A — SPHERICAL ABERRATION SINE CONDITION
FIG. 12B — SPHERICAL ABERRATION CHROMATIC ABERRATION
FIG. 12C — ASTIGMATISM

SPHERICAL ABERRATION
SINE CONDITION

SPHERICAL ABERRATION
CHROMATIC ABERRATION

ASTIGMATISM

SPHERICAL ABERRATION
SINE CONDITION

SPHERICAL ABERRATION
CHROMATIC ABERRATION

ASTIGMATISM

SPHERICAL ABERRATION
SINE CONDITION

SPHERICAL ABERRATION
CHROMATIC ABERRATION

ASTIGMATISM

FIG. 21A  FIG. 21B  FIG. 21C
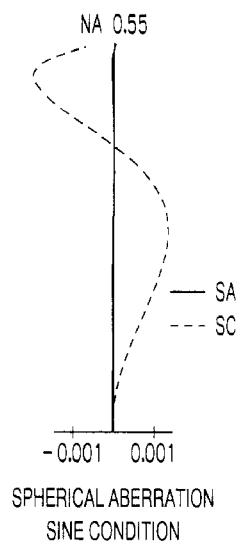
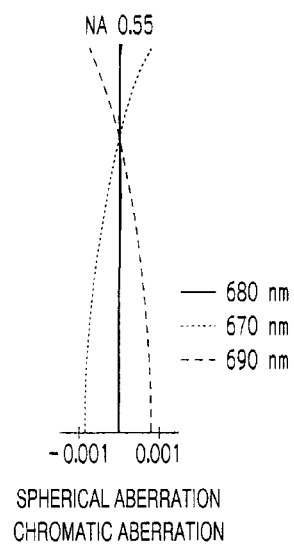
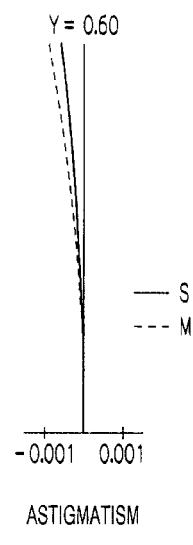
FIG. 22A  FIG. 22B  FIG. 22C
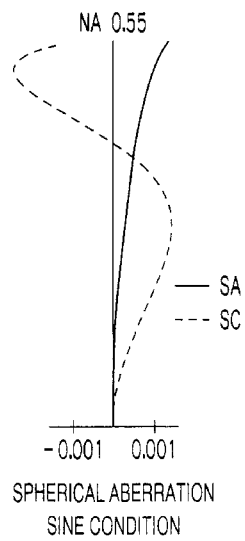
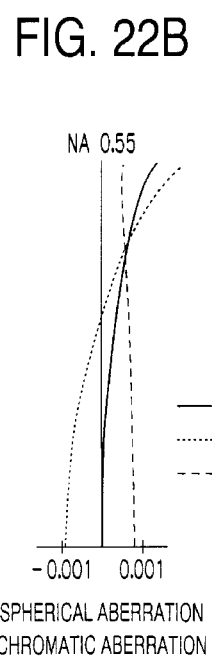
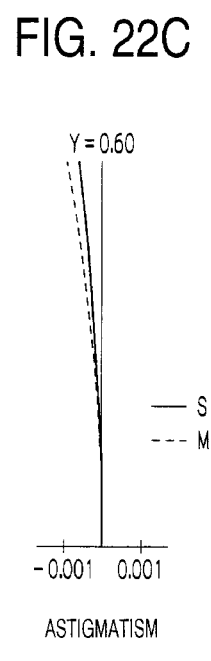

SPHERICAL ABERRATION
SINE CONDITION

SPHERICAL ABERRATION
CHROMATIC ABERRATION

ASTIGMATISM

OBJECTIVE LENS FOR OPTICAL PICK-UP

BACKGROUND OF THE INVENTION

The present invention relates to a high NA (numerical aperture) objective lens installed in an optical pick-up of an optical disc apparatus for a digital versatile disc (DVD), a magneto-optical disc (MO) or the like. Particularly, the present invention relates to the objective lens that has a diffractive grating formed on a surface of a refractive lens.

An optical pick-up of an optical disc apparatus employs, in general, a single-piece plastic objective lens having both aspherical surfaces. Plastic lenses have advantages since the weight is relatively light, and the lenses can be formed relatively easily by an injection molding process.

However, the plastic lens has some disadvantages as follows. The major disadvantage is significant performance change depending on the temperature. It is because, the plastic lens has higher sensitivity to temperature in terms of the refractive index, and larger heat expansion property than a glass lens. For instance, when temperature rises, the refractive index of the plastic lens decreases, then spherical aberration changes to be overcorrected, and consequently, wave front aberration increases. When the wave front aberration exceeds the predetermined permissible level, the objective lens cannot form a sufficiently small beam spot on an optical disc. The sensitivity, which is a ratio of the refractive index variation with respect to a temperature change, is approximately $-10 \times 10^{-5}/°C$.

FIG. 27 is a graph showing a change of wave front aberration (unit:$\lambda$, wavelength) with respect to the NA for a plastic lens (focal length: 3.0 mm at wavelength 650 nm), when the temperature rises by 40 degrees and the refractive index is changed by $-400 \times 10^{-5}$. As shown in the graph, the change of the wave front aberration when the temperature is changed is substantially proportional to the fourth power of NA.

The NA of an objective lens for a CD apparatus is approximately 0.45 and the permissible level of the wave front aberration is approximately $0.04\lambda$. This allows temperature variation in a range of 90 degrees. For example, the range is $30\pm45°$ C. Since the temperature range allowing the permissible level of the wave front aberration is sufficiently large, the deterioration of the wave front aberration due to temperature variation is virtually out of question in the CD apparatus.

On the other hand, the NA of an objective lens for the DVD apparatus is about 0.60, that for the MO disc apparatus is about 0.65 and the permissible level of the wave front aberration is approximately $0.03\lambda$. In this case, when the temperature changes by 40 or 50 degrees, the wave front aberration exceeds the permissible level, which may cause a problem in reading and/or writing information.

SUMMARY OF THE INVENTION

It is therefore an object of the present invention to provide an objective lens for an optical pick-up, which is capable of reducing the change of the wave front aberration due to temperature change to widen the permissible range of the temperature change even when the objective lens is applied to the DVD apparatus or the MO disc apparatus.

For the above object, according to the present invention, there is provided an improved objective lens for an optical pick-up, which includes a refractive lens having a positive refractive power, and a diffractive grating having a plurality of concentric ring-shaped steps that are formed on at least one lens surface of the refractive lens. The diffractive grating has wavelength dependence such that spherical aberration varies in an undercorrected direction as wavelength of incident light increases.

As described above, spherical aberration of a positive refractive lens varies in the overcorrected direction as temperature rises. A semiconductor laser, which is generally used as a light source of an optical pick-up, has temperature dependence such that wavelength of the emitted laser increases as temperature rises. When the temperature rises, the refractive lens changes the spherical aberration in the overcorrected direction, and the diffractive grating changes the spherical aberration in the undercorrected direction because the wavelength of the light emitted from the semiconductor laser increases. Thus the changes of the spherical aberrations caused by the refractive lens and the diffractive grating can be counterbalanced to each other.

The refractive lens is desirable to be a plastic lens to make an inexpensive and lightweight objective lens and to easily transfer a grating pattern of a mold to the lens. Since a high NA lens requires strict aberration correction, a double aspherical biconvex lens is desirable to make a high NA lens.

An additional optical path length added by a diffractive grating is expressed by the following optical path difference function $\Phi(h)$:

$$\Phi(h) = (P_2 h^2 + P_4 h^4 + P_6 h^6 + \ldots) \times \lambda$$

where $P_2$, $P_4$ and $P_6$ are diffractive coefficients of second, fourth and sixth orders, h is a height from the optical axis and $\lambda$ is wavelength of incident light.

The objective lens according to the present invention may satisfy the following condition (1);

$$-75.0 < P_4 \times (h_{max})^4/(f \times NA^4) < -25.0 \tag{1}$$

where $h_{max}$ is the maximum height from the optical axis in the effective diameter, NA is a numerical aperture, and f is a total focal length of the refractive lens and the diffractive grating.

Further, it is desirable for the refractive lens and the diffractive grating to have total longitudinal chromatic aberration such that the backfocus increases as the wavelength of the incident light increases. In such a case, it is advisable that the following condition (2) is satisfied;

$$-1 < \Delta CA/\Delta SA < 0 \tag{2}$$

where $\Delta CA$ is a movement of a paraxial focal point with wavelength shift and $\Delta SA$ is a variation of spherical aberration for marginal rays with wavelength shift. In special cases, the objective lens satisfies the following condition (2');

$$-0.7 < \Delta CA/\Delta SA < -0.5. \tag{2'}$$

The diffractive grating of the objective lens according to the present invention may have a positive paraxial power, and it is desirable to satisfy the following condition (3);

$$40.0 < f_D/f < 140.0 \tag{3}$$

where $f_D$ is the focal length of the diffractive grating that is defined as the following equation;

$$f_D = 1/(-P_2 \times 2\lambda).$$

DESCRIPTION OF THE ACCOMPANYING DRAWINGS

FIG. 1A is a front view of an objective lens according to embodiments;

FIG. 1B is a side view of an objective lens according to embodiments;

FIG. 1C is an enlarged view of FIG. 1B;

FIG. 2 is a lens diagram of the objective lens according to a first embodiment;

FIGS. 3A, 3B and 3C are graphs showing various aberrations of the objective lens according to the first embodiment at the standard refractive index;

FIGS. 4A, 4B and 4C are graphs showing various aberrations of the objective lens according to the first embodiment when the refractive index becomes lower than the standard value by 0.004;

FIG. 11 is a lens diagram of the objective lens according to a fourth embodiment;

FIGS. 12A, 12B and 12C are graphs showing various aberrations of the objective lens according to the fourth embodiment at the standard refractive index;

FIGS. 21A, 21B and 21C are graphs showing various aberrations of the objective lens according to the seventh embodiment at the standard refractive index;

FIGS. 22A, 22B and 22C are graphs showing various aberrations of the objective lens according to the seventh embodiment when the refractive index becomes lower than the standard value by 0.004;

DESCRIPTION OF THE EMBODIMENTS

Figure 5:
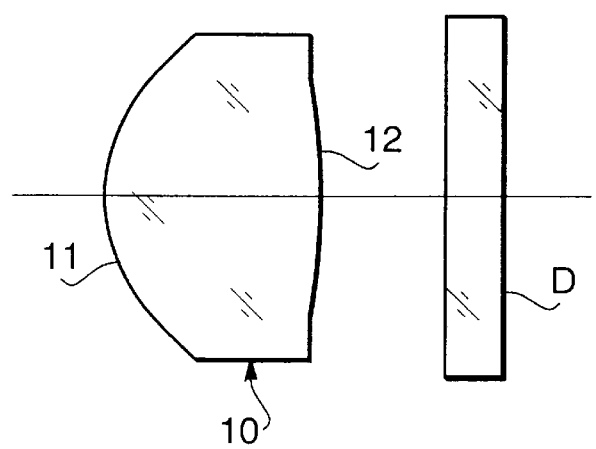
FIG. 5 is a lens diagram of the objective lens according to a second embodiment.

FIGS. 1A, 1B and 1C show an objective lens 10 according to embodiments, FIG. 1A is a front view, FIG. 1B is a side view and FIG. 1C is an enlarged side view. The objective lens 10 is used for an optical pick-up of an optical disc apparatus such as a digital versatile disc (DVD) apparatus or a magneto-optic (MO) disc apparatus. The objective lens 10 converges incident light emitted from a semiconductor laser as a light source onto an optical disc.

The objective lens 10 is a biconvex plastic lens of which first and second surfaces 11 and 12 are aspherical. A diffractive grating is formed on the first surface 11 of the objective lens 10. The diffractive grating is similar to a Fresnel lens, it is formed as a large number of concentric rings each of which is a wedge sectional shape. The boundary between the adjacent rings is a step to give a predetermined optical path difference.

The diffractive grating has wavelength dependence such that spherical aberration varies in the undercorrected direction as wavelength of incident light increases. The wavelength of the laser beam from a semiconductor laser increases with temperature rising, and the varying ratio is about 0.2 nm/° C. For example, when the temperature rises by 40 degrees, the wavelength of the emitted laser increases by 8 nm.

On the other hand, refractive index of the refractive lens varies with temperature, which changes spherical aberration. The spherical aberration of a positive refractive lens varies in the overcorrected direction when temperature increases.

When the temperature increases, the refractive lens changes the spherical aberration in the overcorrected direction, the diffractive grating changes the spherical aberration in the undercorrected direction because the wavelength of the light emitted from the semiconductor laser increases. Thus the changes of the spherical aberration caused by the refractive lens and the diffractive grating can counterbalance to each other.

An additional optical path length added by a diffractive grating is expressed by the following optical path difference function $\Phi(h)$:

$$\Phi(h)=(P_2h^2+P_4h^4+P_6h^6+\ldots)\times\lambda$$

where $P_2$, $P_4$ and $P_6$ are coefficients of second, fourth and sixth orders, h is a height from the optical axis and $\lambda$ is a wavelength of incident light. The function $\Phi(h)$ represents an optical path difference between an imaginary ray that is assumed not to be diffracted by the grating and an actual ray that is diffracted by the grating, at a point on the grating where the height from the optical axis is h. In such an expression, a negative value of the second order coefficient $P_2$ represents a positive paraxial power of the diffractive grating. Further, the negative power increases when increasing the distance from the optical axis when the fourth order coefficient P4 is larger than zero.

An actual microscopic shape of the diffractive grating is defined like a Fresnel lens having a large number of concentric rings. The actual shape $\Phi'(h)$ is defined by subtracting $\lambda \times m$ (m:integer) from $\Phi(h)$ as follows.

$$\Phi'(h)=(MOD(P_2h^2+P_4h^{4+}\cdots ^-C, 1)-C)\times\lambda$$

Symbol C is a constant defining a phase at a boundary between adjacent rings ($0 \leq C \leq 1$). The function MOD(x, y) represents the reminder when x is divided by y. $MOD(P_2h^2+P_4h^4+ \ldots +Const, 1)$ is equal to zero at the boundary. The diffractive grating is formed on the base curve. Inclines and steps of the ring areas are designed such that the optical path differences are defined by $\Phi'(h)$.

The objective lens 10 satisfies the following condition (1);

$$-75.0 < P_4 \times (h_{max})^4/(f \times NA^4) < -25.0 \qquad (1)$$

where $h_{max}$ is the maximum height from the optical axis in the effective diameter, NA is a numerical aperture, and f is a total focal length of the refractive lens and the diffractive grating.

When the condition (1) is satisfied, the variation of the spherical aberration of the refractive lens due to change of the refractive index can be efficiently counterbalanced by the variation of the spherical aberration of the diffractive grating due to the wavelength change. If the intermediate term of the condition (1) becomes lower than −75.0, the variation of the spherical aberration due to wavelength shift becomes too large. Since the laser wavelength of the semiconductor laser has a tolerance of about ±10 nm due to an individual difference, the large variation of the spherical aberration prohibits the use of a semiconductor laser of which laser wavelength is different from the standard wavelength. This requires selection of the semiconductor laser, which decreases yield. The compensation effect of the spherical aberration by the diffractive grating is, therefore, desirable to be small.

On the other hand, when the intermediate term of the condition (1) exceeds −25.0, the variation of the spherical aberration due to wavelength shift becomes too small, which cannot counterbalance the variation of the spherical aberration due to the change of the refractive index. Further, the most suitable value of the intermediate term of the condition (1) is about −55 when the spherical aberration varies depending upon the wavelength shift of the semiconductor laser due to change of temperature of which ratio is about 0.2 nm/° C.

The wavelength shifts of the laser due to the change of temperature changes the backfocus of the objective lens, which causes focus error. Since the variations of the spherical aberrations are counterbalanced, this wavelength shift does not deteriorate the wave front aberration. Further, since the change of backfocus due to temperature change are very slow, the focus error can be corrected by a focus adjusting mechanism in the optical pick-up.

On the other hand, the wavelength of the laser is rapidly changed by switching of the laser output during recording in the MO apparatus. The rapid wavelength shift does not involve the temperature change, the variation of the spherical aberration due to the diffractive grating is not counterbalanced by the change of the refractive index of the refractive lens. In view of this point, the compensation effect of the spherical aberration by the diffractive grating is desirable to be short. Namely, it is desirable that the spherical aberration of the refractive lens is not perfectly compensated by the diffractive grating.

The rapid wavelength shift also causes the focus error, and it cannot be perfectly corrected by the focus adjusting mechanism. Thus, the movement of the focal point is desirable to be reduced.

The movement of the focal point may be reduced by correcting longitudinal chromatic aberration in general. However, since the objective lens of the embodiment has the wavelength dependence in the spherical aberration, the perfect correction in the longitudinal chromatic aberration, on the contrary, increases the movement of the best focus position. Thus the correction of the chromatic aberration should be balanced with the variation of the spherical aberration due to wavelength shift.

For the purpose, the refractive lens and the diffractive grating of the embodiment have total longitudinal chromatic aberration such that the backfocus increases as the wavelength of the incident light increases, and the following condition (2) is satisfied, $$-1 < \Delta CA/\Delta SA < 0 \qquad (2)$$

where $\Delta CA$ is a movement of a paraxial focal point with wavelength shift and $\Delta SA$ is a variation of spherical aberration for marginal rays with wavelength shift.

When the condition. (2) is satisfied, increasing of the wavelength moves the paraxial focal point away from the lens and moves the focal point by the marginal rays closer to the lens. If the spherical aberration is almost corrected in the standard wavelength $\lambda_0$, the paraxial focal point at the increased wavelength $\lambda_1 (>\lambda)$ is further from the lens than the paraxial focal point at the standard wavelength $\lambda_0$, and the focal point by the marginal rays at the increased wavelength $\lambda_1$ is nearer to the lens than the paraxial focal point at the standard wavelength $\lambda_0$. Therefore, the movement of the best focus position, which is average from the paraxial focal point to the focal point by the marginal rays, can be reduced.

It is more desirable to satisfy the following condition (2'). The upper limit −0.5 is determined to minimize the number of the rings of the diffractive grating in order to increase the diffraction efficiency. The lower limit −0.7 is determined with considering the incident laser on the objective lens has intensity distribution of Gaussian beam.

$$-0.7 < \Delta CA/\Delta SA < -0.5. \qquad (2')$$

Further, the objective lens 10 satisfies the following condition (3) to reduce the movement of the best focus position due to rapid wavelength shift.

$$40.0 < f_D/f < 140.0 \qquad (3)$$

Where f is the total focal length of the objective lens, and $f_D$ is the focal length of the diffractive grating that is defined as the following equation;

$$f_D=1/(-P_2 \times 2\lambda).$$

The condition (3) defines the compensation effect for the longitudinal chromatic aberration. It is known that a value corresponding to Abbe number for a diffractive lens usually has a negative value. The negative sign of the value reflects the opposite sense of the dispersion when compared with that of refractive lenses, and its low magnitude is an indication of the large dispersion. Therefore, a use of a diffractive grating having small positive power in association with the refractive lens compensates the chromatic aberration.

When the condition (3) is satisfied, the movement of the best focus position due to rapid wavelength shift can be reduced while keeping the compensation effect for the spherical aberration due to the change of temperature.

Eight embodiments according to the above mentioned construction will be described hereinafter. The embodiments 1 through 4 show the objective lenses used in the optical pick-up of the DVD apparatus for the optical disc having 0.6 mm cover layer, and the embodiments 5 through 8 show the objective lenses used in the optical pick-up of the MO apparatus for the optical disc having 1.2 mm cover layer. The diffractive grating is formed on the first surface in any embodiments.

Embodiment 1

FIG. 2 shows the objective lens 10 of the embodiment 1 and the cover layer D of the optical disc. The numerical constructions thereof are described in TABLE 1. The surfaces #1 and #2 represent the objective lens 10 and the surfaces #3 and #4 represent the cover layer D.

In TABLE 1, NA denotes numerical aperture, f (unit:mm) denotes the total focal length, $f_D$(unit:mm) denotes focal length of the diffractive grating, ω(unit:degree) denotes half angle of view, λ(unit:nm) denotes wavelength, $h_{max}$ (unit:mm) denotes the maximum height from the optical axis in the effective diameter, r (unit:mm) denotes a radius of curvature of a surface (the values at the vertex for aspherical surface), d (unit:mm) denotes a distance between the surfaces along the optical axis, nλ denotes a refractive index at a wavelength λ nm and vd denotes an Abbe number. The refractive index is defined in a standard temperature, which is, for example, 25° C.

The base curve of the first surface 11 (surface #1) is aspherical. The base curve is defined as a shape of the refractive lens that does not include the diffractive grating.

The second surface 12 (surface #2) is also an aspherical surface. An aspherical surface is expressed by the following equation:

$$X(h) = \frac{h^2 c}{1 + \sqrt{1 - (1+K)h^2 c^2}} + A_4 h^4 + A_6 h^6 + A_8 h^8 + A_{10} h^{10} + A_{12} h^{12}$$

X(h) is a SAG, that is, a distance of a curve from a tangential plane at a point on the surface where the height from the optical axis is h. C is a curvature (1/r) of the vertex of the surface, K is a conic constant, $A_4$, $A_6$, $A_8$, $A_{10}$ and $A_{12}$ are aspherical surface coefficients of fourth, sixth, eighth, tenth and twelfth orders. The constant K and coefficients $A_4$ through $A_{12}$ of the first and second surfaces of the objective lens 10 are shown in the following TABLE 2.

Further, TABLE 2 indicates coefficients of second, fourth, sixth, eighth and tenth orders $P_2$, $P_4$, $P_6$, $P_8$ and $P_{10}$ of the optical path difference function Φ(h) to define the diffractive grating.

TABLE 1

NA 0.6 f = 3.00 mm $f_D$ = 155.49 mm ω =1.1° λ = 650 nm
$h_{max}$ = 1.80 min

| Surface Number | r | d | n650 | vd |
|---|---|---|---|---|
| #1 | 1.954 | 2.287 | 1.54082 | 55.6 |
| #2 | −6.293 | 1.372 | | |
| #3 | ∞ | 0.600 | 1.58030 | 29.9 |
| #4 | ∞ | | | |

TABLE 2

| | Surface #1 | Surface #2 |
|---|---|---|
| K | −0.4430 | 0.0000 |
| $A_4$ | −0.3390 × $10^{-2}$ | 0.2690 × $10^{-1}$ |
| $A_6$ | 0.4400 × $10^{-4}$ | −0.9344 × $10^{-2}$ |
| $A_8$ | −0.1320 × $10^{-3}$ | 0.1405 × $10^{-2}$ |
| $A_{10}$ | 0.2120 × $10^{-4}$ | −0.5700 × $10^{-4}$ |
| $A_{12}$ | −0.1321 × $10^{-4}$ | 0.0000 |
| $P_2$ | −4.9473 | |
| $P_4$ | −2.1749 | |
| $P_6$ | 1.5476 × $10^{-1}$ | |
| $P_8$ | 4.2348 × $10^{-2}$ | |
| $P_{10}$ | −1.4462 × $10^{-2}$ | |

FIGS. 3A through 3C show third order aberrations of the objective lens according to the first embodiment at the standard refractive index, FIG. 3A shows spherical aberration SA and sine condition SC at wavelength 650 nm, FIG. 3B shows chromatic aberration represented by spherical aberrations at wavelengths 650 nm, 642 nm and 658 nm; and FIG. 3C shows astigmatism (S: Sagittal, M: Meridional).

The vertical axes in FIGS. 3A and 3B represent the numerical aperture NA, and the vertical axis in FIG. 3C represents image height Y. Unit of the horizontal axis is "mm" in each of FIGS. 3A through 3C. FIGS. 4A, 4B and 4C are graphs that are similar to FIGS. 3A, 3B and 3C when the refractive index becomes lower than the standard value by 0.004. When the temperature rises by 40 degrees, the refractive index changes by 0.004.

The difference between the plotted curves in FIG. 3A and FIG. 4A represents that the spherical aberration varies in the overcorrected direction with decreasing of the refractive index (with temperature rising). The difference of the curves of spherical aberration at 650 nm and at 658 nm in FIG. 3B shows that the diffractive grating changes the spherical aberration in the undercorrected direction as the wavelength increases by 8 nm. Temperature rising by 40 degrees increases the wavelength of the laser beam emitted from the semiconductor laser by 8 nm. Accordingly, the curve of the spherical aberration at 658 nm in FIG. 4B represents the spherical aberration of the objective lens when temperature rises by 40 degrees as compared with the standard temperature.

Thus when the temperature rises, the change of the spherical aberration in the overcorrected direction due to change of the refractive index can be counterbalanced with the change of the spherical aberration in the undercorrected direction due to the change of the wavelength, which keeps out increase of the wave front aberration. Since the rising of temperature decreases the refractive index of the objective lens, the best focus position of the objective lens moves such that the backfocus increases. The movement of the best focus position can be compensated by the focus adjusting mechanism of the optical pick-up.

The paraxial focal point moves such that the backfocus increases as the wavelength of the incident light increases. The movement of the paraxial focal point ΔCA by +8 nm wavelength shift is represented by the width between the lower ends of the curves for 650 nm and 658 nm. The variation of spherical aberration for marginal rays ΔSA by +8 nm wavelength shift is represented by the width between the upper end of the curve for 658 nm and the upper end of the parallel translated curve from the curve for 650 nm so that the lower end thereof is moved to the lower end of the curve for 658 nm. When the ratio of these values satisfies the condition (2), the curves for 658 nm and 642 nm in FIG. 3B intersect the vertical axis, which implies that the moving amount of the best focus position due to the rapid wavelength shift becomes relatively small.

Embodiment 2

FIG. 5 shows an objective lens according to the second embodiment. The numerical construction of the second embodiment is indicated in TABLE 3. TABLE 4 shows conic constants and aspherical surface coefficients for the first and second surfaces, and diffractive coefficients of the diffractive grating formed on the first surface.

Figure 6A:
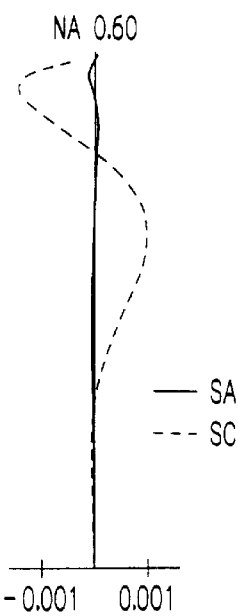
FIGS. 6A, 6B and 6C are graphs showing various aberrations of the objective lens according to the second embodiment at the standard refractive index.
Figure 6B:
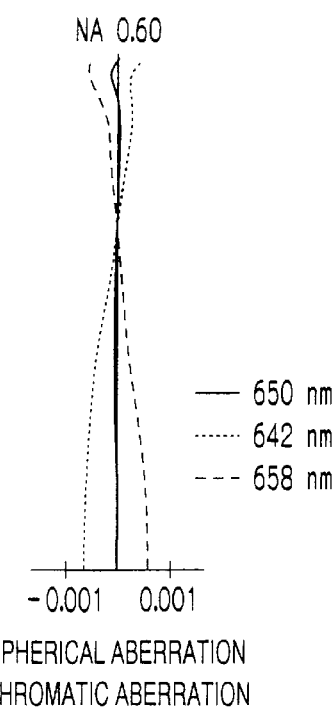
Figure 6C:
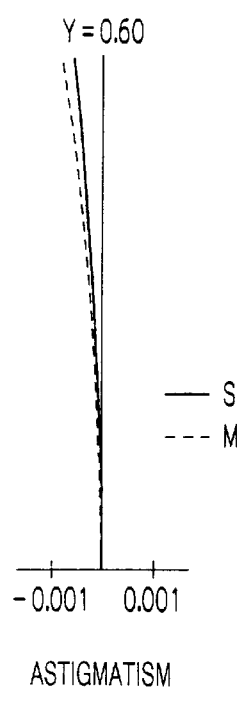
Figures 7A, 7B, 7C:
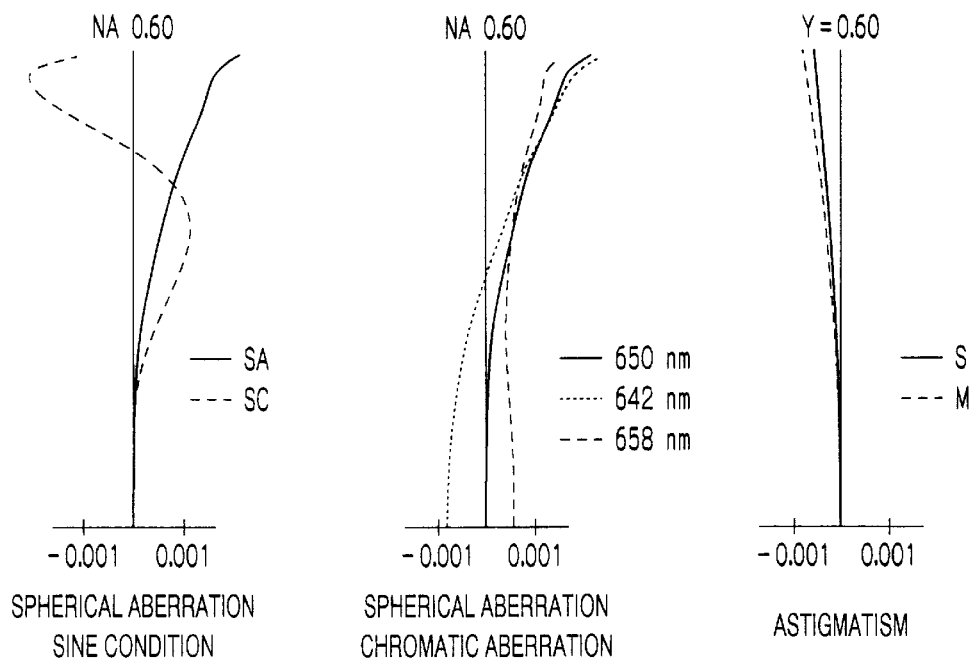
FIGS. 7A, 7B and 7C are graphs showing various aberrations of the objective lens according to the second embodiment when the refractive index becomes lower than the standard value by 0.004.

FIGS. 6A through 6C show various aberrations of the objective lens according to the second embodiment at the standard refractive index, and FIGS. 7A through 7C show various aberrations when the refractive index becomes lower than the standard value by 0.004.

TABLE 3

NA 0.6 f = 3.00 mm $f_D$ = 176.75 mm ω = 1.1° λ = 650 nm
$h_{max}$ = 1.80 mm

| Surface Number | r | d | n650 | vd |
|---|---|---|---|---|
| #1 | 1.950 | 2.283 | 1.54082 | 55.6 |
| #2 | −6.239 | 1.372 | | |
| #3 | ∞ | 0.600 | 1.58030 | 29.9 |
| #4 | ∞ | | | |

TABLE 4

| | Surface #1 | Surface #2 |
|---|---|---|
| K | −0.4440 | 0.0000 |
| $A_4$ | −0.3600 × $10^{-2}$ | 0.2696 × $10^{-1}$ |
| $A_6$ | 0.4300 × $10^{-4}$ | −0.9482 × $10^{-2}$ |
| $A_8$ | −0.1350 × $10^{-3}$ | 0.1446 × $10^{-2}$ |
| $A_{10}$ | 0.2045 × $10^{-4}$ | −0.6138 × $10^{-4}$ |
| $A_{12}$ | −0.1330 × $10^{-4}$ | 0.0000 |
| $P_2$ | −4.3520 | |
| $P_4$ | −2.3161 | |
| $P_6$ | 1.7724 × $10^{-4}$ | |
| $P_8$ | 3.9988 × $10^{-2}$ | |
| $P_{10}$ | −1.4133 × $10^{-2}$ | |

Embodiment 3

Figure 8:
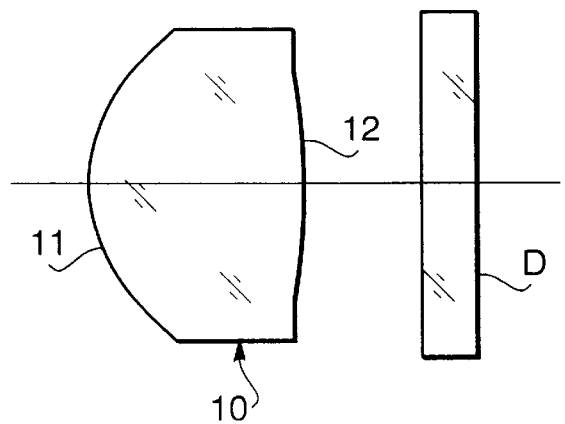
FIG. 8 is a lens diagram of the objective lens according to a third embodiment.

FIG. 8 shows an objective lens according to the third embodiment. The numerical construction of the third embodiment is indicated in TABLE 5. TABLE 6 shows conic constants and aspherical surface coefficients for the first and second surfaces, and diffractive coefficients of the diffractive grating formed on the first surface.

Figure 9A:
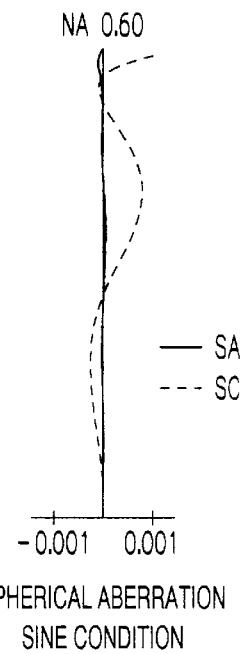
FIGS. 9A, 9B and 9C are graphs showing various aberrations of the objective lens according to the third embodiment at the standard refractive index.
Figure 9B:
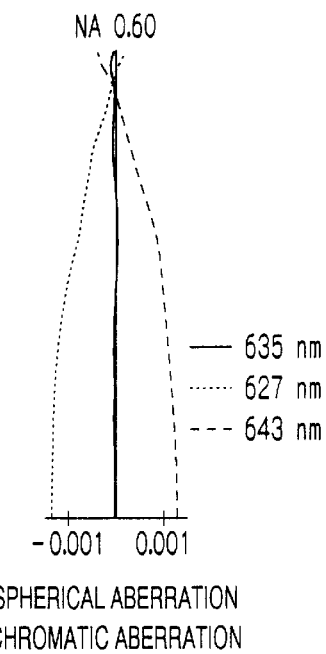
Figure 9C:
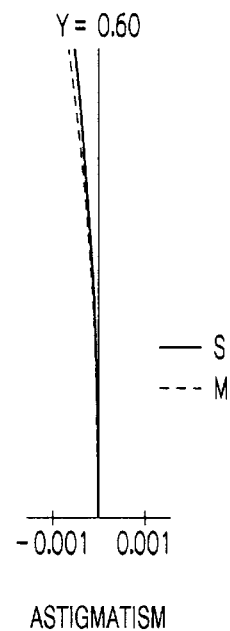
Figure 10A:
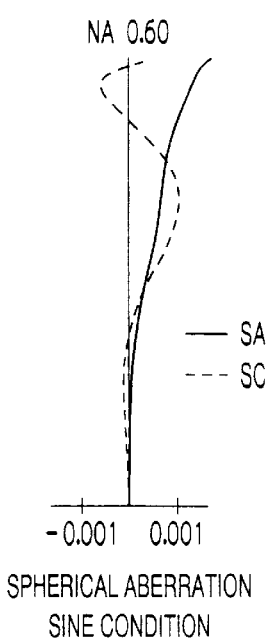
FIGS. 10A, 10 and 10C are graphs showing various aberrations of the objective lens according to the third embodiment when the refractive index becomes lower than the standard value by 0.004.
Figure 10B:
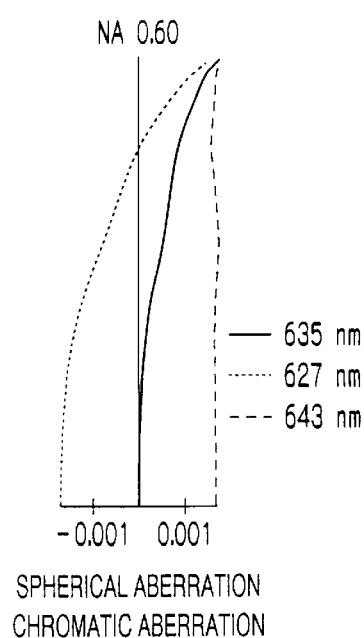
Figure 10C:
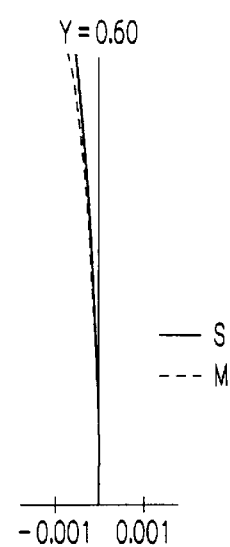

FIGS. 9A through 9C show various aberrations of the objective lens according to the third embodiment at the standard refractive index, and FIGS. 10A through 10C show various aberrations when the refractive index becomes lower than the standard value by 0.004.

TABLE 5

NA 0.6 f = 3.00 mm $f_D$ = ∞ ω = 1.1° λ = 635 nm
$h_{max}$ = 1.80 mm

| Surface Number | r | d | n635 | vd |
|---|---|---|---|---|
| #1 | 1.939 | 2.404 | 1.54142 | 55.6 |
| #2 | −5.649 | 1.372 | | |
| #3 | ∞ | 0.600 | 1.58139 | 29.9 |
| #4 | ∞ | | | |

TABLE 6

| | Surface #1 | Surface #2 |
|---|---|---|
| K | −0.4400 | 0.0000 |
| $A_4$ | −0.2690 × $10^{-2}$ | 0.3000 × $10^{-1}$ |
| $A_6$ | −0.6470 × $10^{-3}$ | −0.1053 × $10^{-1}$ |
| $A_8$ | −0.8470 × $10^{-4}$ | 0.1587 × $10^{-2}$ |
| $A_{10}$ | 0.1870 × $10^{-4}$ | −0.6427 × $10^{-4}$ |
| $A_{12}$ | −0.1303 × $10^{-4}$ | 0.0000 |
| $P_2$ | 0.0000 | |
| $P_4$ | −1.1941 | |
| $P_6$ | −3.9226 × $10^{-1}$ | |
| $P_8$ | 8.6513 × $10^{-2}$ | |
| $P_{10}$ | −1.1890 × $10^{-2}$ | |

The objective lens of the third embodiment is not compensated in the longitudinal chromatic aberration and thus it is suitable for a read-only pick-up. The second diffractive coefficient $P_2$, which defines the paraxial power, is zero in the third embodiment. This means no compensation in the longitudinal chromatic aberration. Since the read-only pick-up is free from rapid change of wavelength of the laser, the compensation of the longitudinal chromatic aberration is not required. When the longitudinal chromatic aberration is not compensated, the number of the rings of the diffractive grating is reduced, reducing the unnecessary order diffractive light, which increases the diffraction efficiency.

Embodiment 4

FIG. 11 shows an objective lens according to the fourth embodiment. The numerical construction of the fourth embodiment is indicated in TABLE 7. TABLE 8 shows conic constants and aspherical surface coefficients for the first and second surfaces, and diffractive coefficients of the diffractive grating formed on the first surface.

Figures 13A, 13B, 13C:
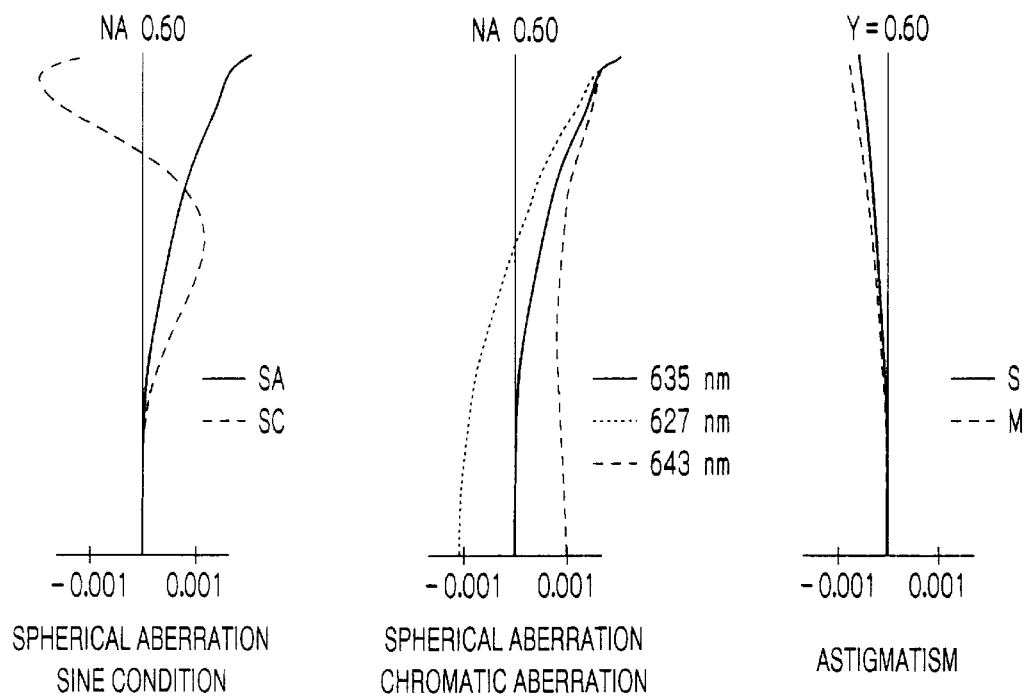
FIGS. 13A, 13B and 13C are graphs showing various aberrations of the objective lens according to the fourth embodiment when the refractive index becomes lower than the standard value by 0.004.

FIGS. 12A through 12C show various aberrations of the objective lens according to the fourth embodiment at the standard refractive index, and FIGS. 13A through 13C show various aberrations when the refractive index becomes lower than the standard value by 0.004.

TABLE 7

NA 0.6 f = 3.00 mm $f_D$ = 176.84 mm ω = 1.1° λ = 635 nm
$h_{max}$ = 1.80 mm

| Surface Number | r | d | n635 | vd |
|---|---|---|---|---|
| #1 | 1951 | 2.280 | 1.54142 | 55.6 |
| #2 | −6.271 | 1.372 | | |
| #3 | ∞ | 0.600 | 1.58139 | 29.9 |
| #4 | ∞ | | | |

TABLE 8

| | Surface #1 | Surface #2 |
|---|---|---|
| K | −0.4450 | 0.0000 |
| $A_4$ | −0.3600 × $10^{-2}$ | 0.2682 × $10^{-1}$ |
| $A_6$ | 0.4750 × $10^{-4}$ | −0.9450 × $10^{-2}$ |
| $A_8$ | −0.1338 × $10^{-3}$ | 0.1453 × $10^{-2}$ |
| $A_{10}$ | 0.2035 × $10^{-4}$ | −0.6590 × $10^{-4}$ |
| $A_{12}$ | −0.1330 × $10^{-4}$ | 0.0000 |
| $P_2$ | −4.4525 | |
| $P_4$ | −2.3918 | |
| $P_6$ | 1.8316 × $10^{-1}$ | |
| $P_8$ | 4.1327 × $10^{-2}$ | |
| $P_{10}$ | −1.4564 × $10^{-2}$ | |

Embodiment 5

Figure 14:
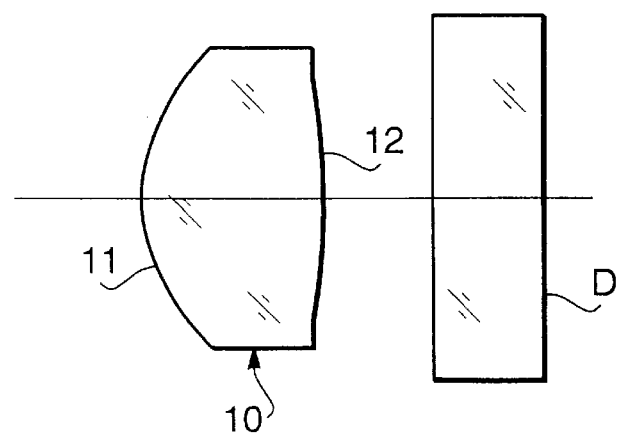
FIG. 14 is a lens diagram of the objective lens according to a fifth embodiment.

FIG. 14 shows an objective lens according to the fifth embodiment. The numerical construction of the fifth embodiment is indicated in TABLE 9. TABLE 10 shows conic constants and aspherical surface coefficients for the first and second surfaces, and diffractive coefficients of the diffractive grating formed on the first surface.

Figure 15A:
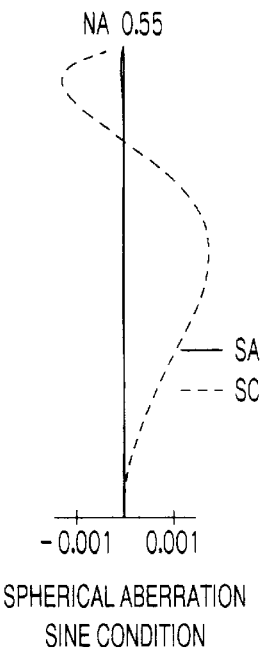
FIGS. 15A, 15B and 15C are graphs showing various aberrations of the objective lens according to the fifth embodiment at the standard refractive index.
Figure 15B:
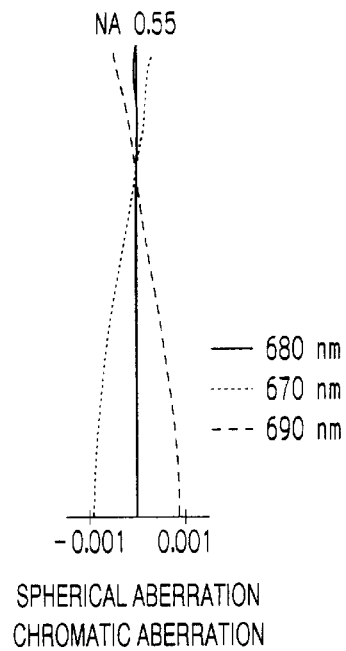
Figure 15C:
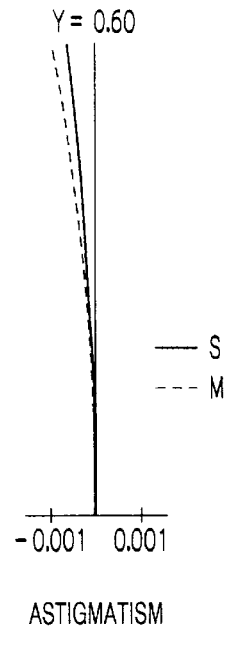
Figure 16A:
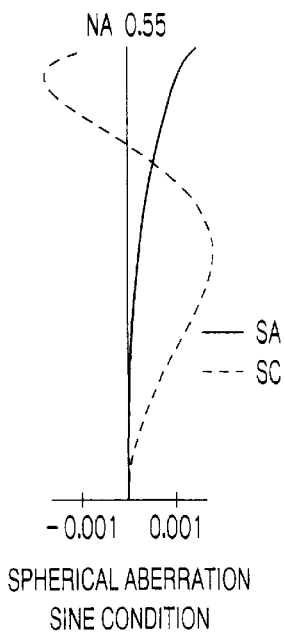
FIGS. 16A, 16B and 16C are graphs showing various aberrations of the objective lens according to the fifth embodiment when the refractive index becomes lower than the standard value by 0.004.
Figure 16B:
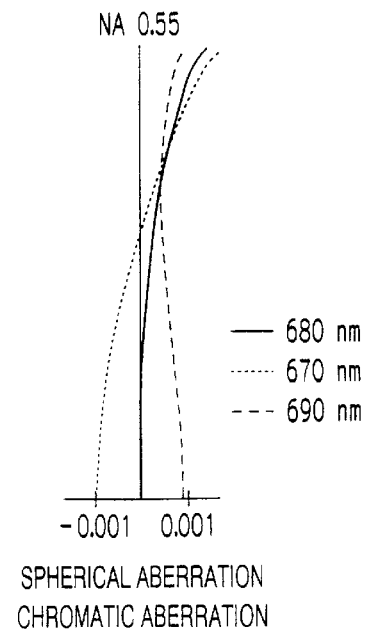
Figure 16C:
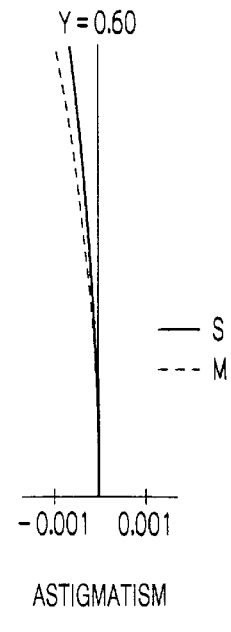

FIGS. 15A through 15C show various aberrations of the objective lens according to the fifth embodiment at the standard refractive index, and FIGS. 16A through 16C show various aberrations when the refractive index becomes lower than the standard value by 0.004.

TABLE 9

NA 0.55 f = 3.00 mm fD = 303.52 mm ω = 1.1° λ = 680 nm
$h_{max}$ = 1.65 mm

| Surface Number | r | d | n680 | vd |
|---|---|---|---|---|
| #1 | 1.976 | 1.909 | 1.53972 | 55.6 |
| #2 | −6.234 | 1.211 | | |
| #3 | ∞ | 1.200 | 1.57834 | 29.9 |
| #4 | ∞ | | | |

TABLE 10

| | Surface #1 | Surface #2 |
|---|---|---|
| K | −0.4440 | 0.0000 |
| $A_4$ | −0.3680 × $10^{-2}$ | 0.2153 × $10^{-1}$ |
| $A_6$ | −0.4200 × $10^{-5}$ | −0.7695 × $10^{-2}$ |
| $A_8$ | −0.1450 × $10^{-3}$ | 0.1369 × $10^{-2}$ |
| $A_{10}$ | −0.1120 × $10^{-4}$ | −0.1035 × $10^{-3}$ |
| $A_{12}$ | −0.8440 × $10^{-5}$ | 0.0000 |

TABLE 10-continued

| | Surface #1 | Surface #2 |
|---|---|---|
| $P_2$ | −2.4225 | |
| $P_4$ | −2.5346 | |
| $P_6$ | 2.7193 × $10^{-4}$ | |
| $P_8$ | 4.6383 × $10^{-3}$ | |
| $P_{10}$ | −8.6672 × $10^{-3}$ | |

Embodiment 6

Figure 17:
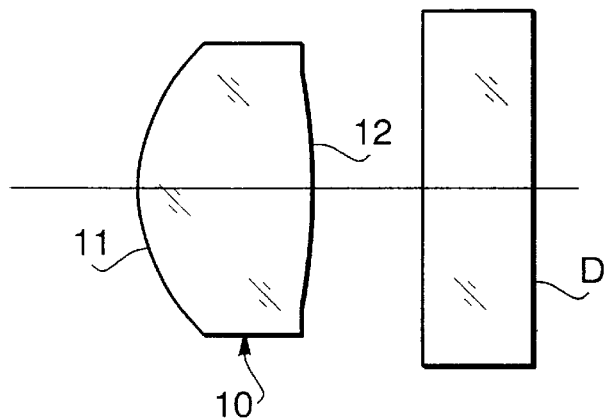
FIG. 17 is a lens diagram of the objective lens according to a sixth embodiment.

FIG. 17 shows an objective lens according to the sixth embodiment. The numerical construction of the sixth embodiment is indicated in TABLE 11. TABLE 12 shows conic constants and aspherical surface coefficients for the first and second surfaces, and diffractive coefficients of the diffractive grating formed on the first surface.

Figure 18A:
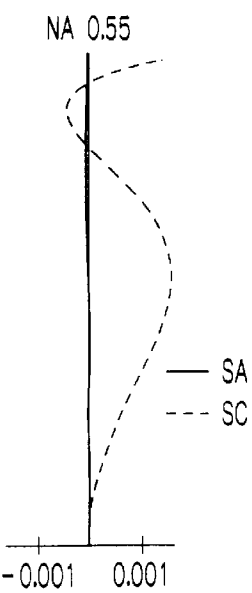
FIGS. 18A, 18B and 18C are graphs showing various aberrations of the objective lens according to the sixth embodiment at the standard refractive index.
Figure 18B:
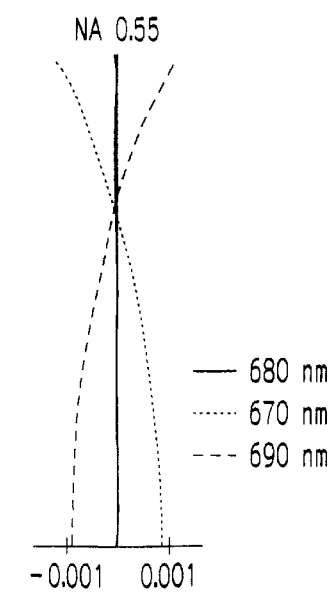
Figure 18C:
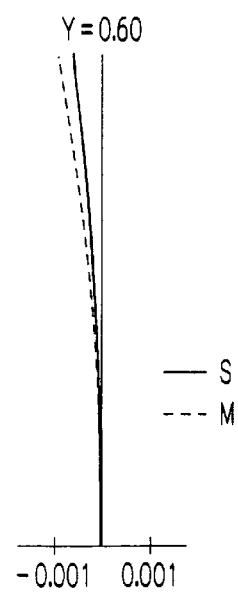
Figures 19A, 19B, 19C:
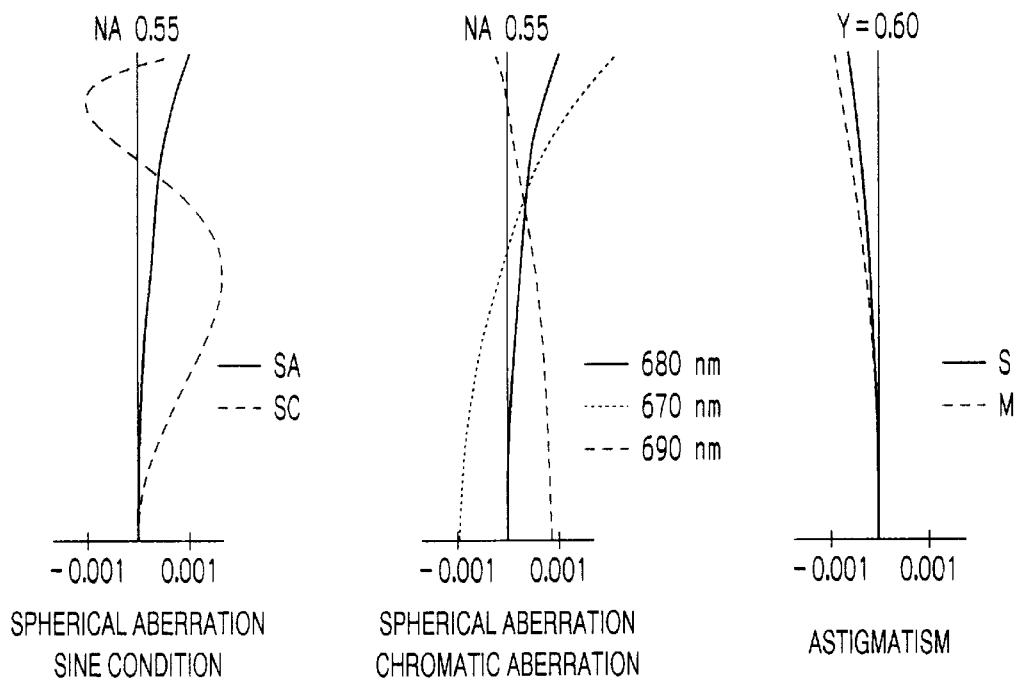
FIGS. 19A, 19B and 19C are graphs showing various aberrations of the objective lens according to the sixth embodiment when the refractive index becomes lower than the standard value by 0.004.

FIGS. 18A through 18C show various aberrations of the objective lens according to the sixth embodiment at the standard refractive index, and FIGS. 19A through 19C show various aberrations when the refractive index becomes lower than the standard value by 0.004.

TABLE 11

NA 0.55 f = 3.00 mm $f_D$ = 303.53 mm ω = 1.1° λ = 680 nm
$h_{max}$ = 1.65 mm

| Surface Number | r | d | n680 | vd |
|---|---|---|---|---|
| #1 | 1.976 | 1.909 | 1.53972 | 55.6 |
| #2 | −6.234 | 1.211 | | |
| #3 | ∞ | 1.200 | 1.57834 | 29.9 |
| #4 | ∞ | | | |

TABLE 12

| | Surface #1 | Surface #2 |
|---|---|---|
| K | −0.4440 | 0.0000 |
| $A_4$ | −0.2980 × $10^{-2}$ | 0.2153 × $10^{-1}$ |
| $A_6$ | −0.5490 × $10^{-3}$ | −0.7695 × $10^{-2}$ |
| $A_8$ | −0.3260 × $10^{-4}$ | 0.1369 × $10^{-2}$ |
| $A_{10}$ | −0.5550 × $10^{-4}$ | −0.1035 × $10^{-3}$ |
| $A_{12}$ | −0.4220 × $10^{-5}$ | 0.0000 |
| $P_2$ | −2.4225 | |
| $P_4$ | −2.0000 | |
| $P_6$ | −1.2000 × $10^{-1}$ | |
| $P_8$ | 4.5000 × $10^{-2}$ | |
| $P_{10}$ | −1.8000 × $10^{-2}$ | |

Embodiment 7

Figure 20:
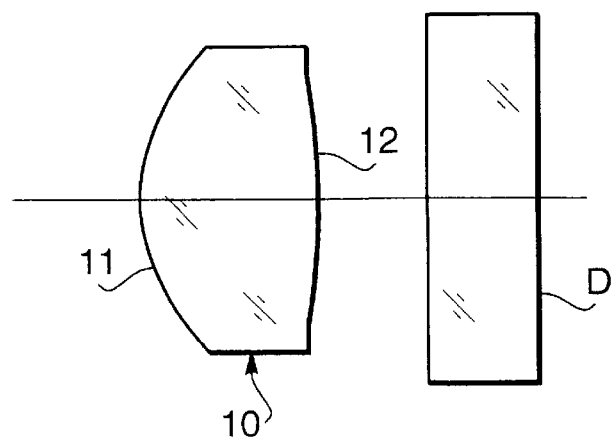
FIG. 20 is a lens diagram of the objective lens according to a seventh embodiment.

FIG. 20 shows an objective lens according to the seventh embodiment. The numerical construction of the seventh embodiment is indicated in TABLE 13. TABLE 14 shows conic constants and aspherical surface coefficients for the first and second surfaces, and diffractive coefficients of the diffractive grating formed on the first surface.

FIGS. 21A through 21C show various aberrations of the objective lens according to the seventh embodiment at the standard refractive index, and FIGS. 22A through 22C show various aberrations when the refractive index becomes lower than the standard value by 0.004.

TABLE 13

NA 0.55 f = 3.00 mm $f_D$ = 272.33 mm ω = 1.1° λ = 680 nm
$h_{max}$ = 1.65 mm

| Surface Number | r | d | n680 | vd |
|---|---|---|---|---|
| #1 | 1.976 | 1.909 | 1.53972 | 55.6 |
| #2 | −6.234 | 1.211 | | |
| #3 | ∞ | 1.200 | 1.57834 | 29.9 |
| #4 | ∞ | | | |

TABLE 14

| | Surface #1 | Surface #2 |
|---|---|---|
| K | −0.4440 | 0.0000 |
| $A_4$ | −0.2470 × $10^{-2}$ | 0.2153 × $10^{-4}$ |
| $A_6$ | −0.4880 × $10^{-3}$ | −0.7695 × $10^{-2}$ |
| $A_8$ | −0.5420 × $10^{-4}$ | 0.1369 × $10^{-2}$ |
| $A_{10}$ | −0.4440 × $10^{-4}$ | −0.1035 × $10^{-3}$ |
| $A_{12}$ | −0.5100 × $10^{-5}$ | 0.0000 |
| $P_2$ | −2.7000 | |
| $P_4$ | −1.6000 | |
| $P_6$ | −1.0000 × $10^{-1}$ | |
| $P_8$ | 3.6000 × $10^{-2}$ | |
| $P_{10}$ | −1.4000 × $10^{-2}$ | |

Embodiment 8

Figure 23:
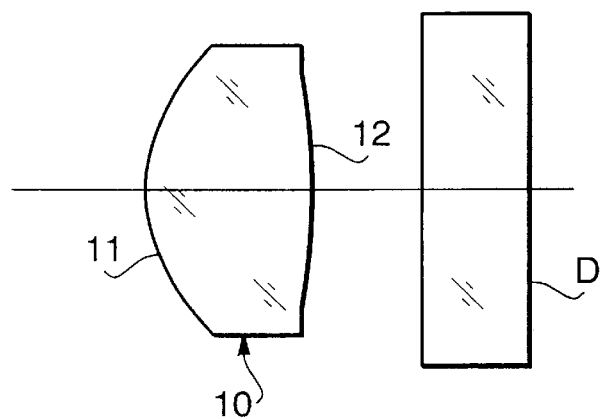
FIG. 23 is a lens diagram of the objective lens according to a eighth embodiment.

FIG. 23 shows an objective lens according to the eighth embodiment. The numerical construction of the eighth embodiment is indicated in TABLE 15. TABLE 16 shows conic constants and aspherical surface coefficients for the first and second surfaces, and diffractive coefficients of the diffractive grating formed on the first surface.

Figure 24A:
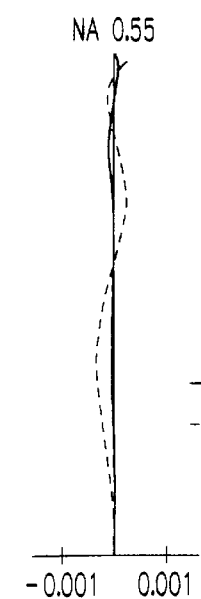
FIGS. 24A, 24B and 24C are graphs showing various aberrations of the objective lens according to the eighth embodiment at the standard refractive index.
Figure 24B:
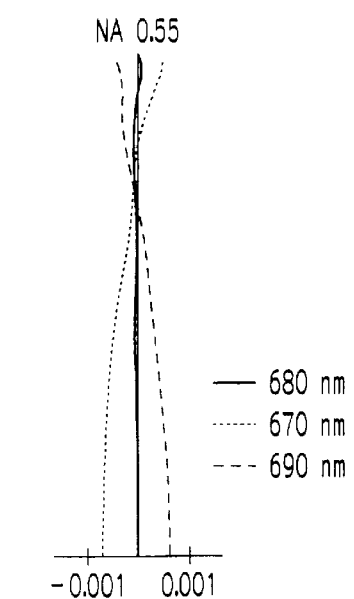
Figure 24C:
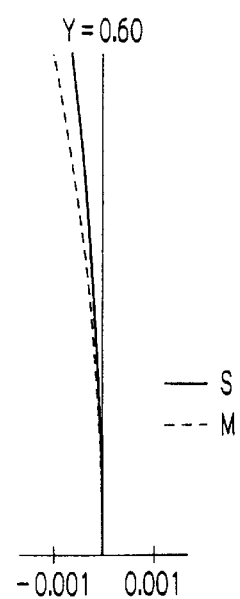
Figure 25A:
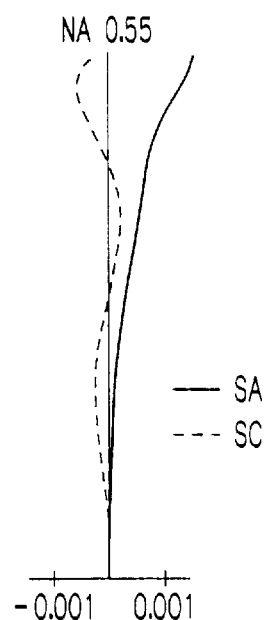
FIGS. 25A, 25B and 25C are graphs showing various aberrations of the objective lens according to the eighth embodiment when the refractive index becomes lower than the standard value by 0.004.
Figure 25B:
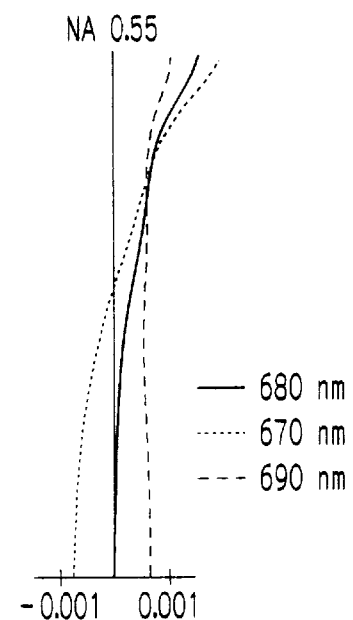
Figure 25C:
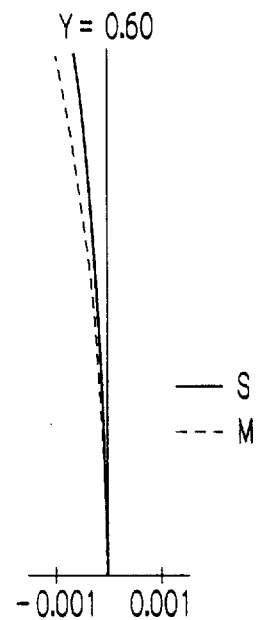

FIGS. 24A through 24C show various aberrations of the objective lens according to the eighth embodiment at the standard refractive index, and FIGS. 25A through 25C show various aberrations when the refractive index becomes lower than the standard value by 0.004.

TABLE 15

NA 0.55 f = 3.00 mm $f_D$ = 200.00 mm ω = 1.1° λ = 680 nm
$h_{max}$ = 1.65 mm

| Surface Number | r | d | n680 | vd |
|---|---|---|---|---|
| #1 | 1.971 | 1.830 | 1.53972 | 55.6 |
| #2 | −6.621 | 1.245 | | |
| #3 | ∞ | 1.200 | 1.57834 | 29.9 |
| #4 | ∞ | | | |

TABLE 16

| | Surface #1 | Surface #2 |
|---|---|---|
| K | −0.3400 | 0.0000 |
| $A_4$ | −0.4480 × $10^{-2}$ | 0.1820 × $10^{-1}$ |
| $A_6$ | −0.4100 × $10^{-3}$ | −0.4057 × $10^{-2}$ |
| $A_8$ | −0.1110 × $10^{-3}$ | 0.1319 × $10^{-3}$ |
| $A_{10}$ | 0.3100 × $10^{-5}$ | 0.3965 × $10^{-4}$ |
| $A_{12}$ | −0.1680 × $10^{-4}$ | 0.0000 |
| $P_2$ | −3.6765 | |
| $P_4$ | −1.6567 | |

TABLE 16-continued

| | Surface #1 | Surface #2 |
|---|---|---|
| $P_6$ | 1.8186 × $10^{-2}$ | |
| $P_8$ | 3.3507 × $10^{-2}$ | |
| $P_{10}$ | −1.1474 × $10^{-2}$ | |

The following TABLE 17 shows the values of the first to eighth embodiments for the conditions (1), (2) and (3). Since all of the embodiments satisfy the condition (1), the deterioration of the wave front aberration due to temperature change can be reduced. The condition (2) is satisfied in all of the embodiments, which reduces the movement of the best focus position due to rapid wavelength shift. Since the embodiments except the third embodiment satisfy the condition (3), the changes of the longitudinal chromatic aberration and the spherical aberration due to wavelength shift can be well balanced, the objective lenses of these embodiments further reduce the movement of the best focus position.

TABLE 17

| | Condition (1) $P_4 \times (h_{max})^4/(f \times NA^4)$ | Condition (2) ΔCA/ΔSA | Condition (3) $f_D/f$ |
|---|---|---|---|
| Embodiment 1 | −58.72 | −0.5 | 51.83 |
| Embodiment 2 | −62.53 | −0.5 | 58.92 |
| Embodiment 3 | −32.24 | −0.8 | — |
| Embodiment 4 | −64.58 | −0.6 | 58.95 |
| Embodiment 5 | −68.43 | −0.7 | 101.17 |
| Embodiment 6 | −54.00 | −0.4 | 101.18 |
| Embodiment 7 | −43.20 | −0.5 | 90.78 |
| Embodiment 8 | −44.73 | −0.6 | 66.67 |

Figure 26:
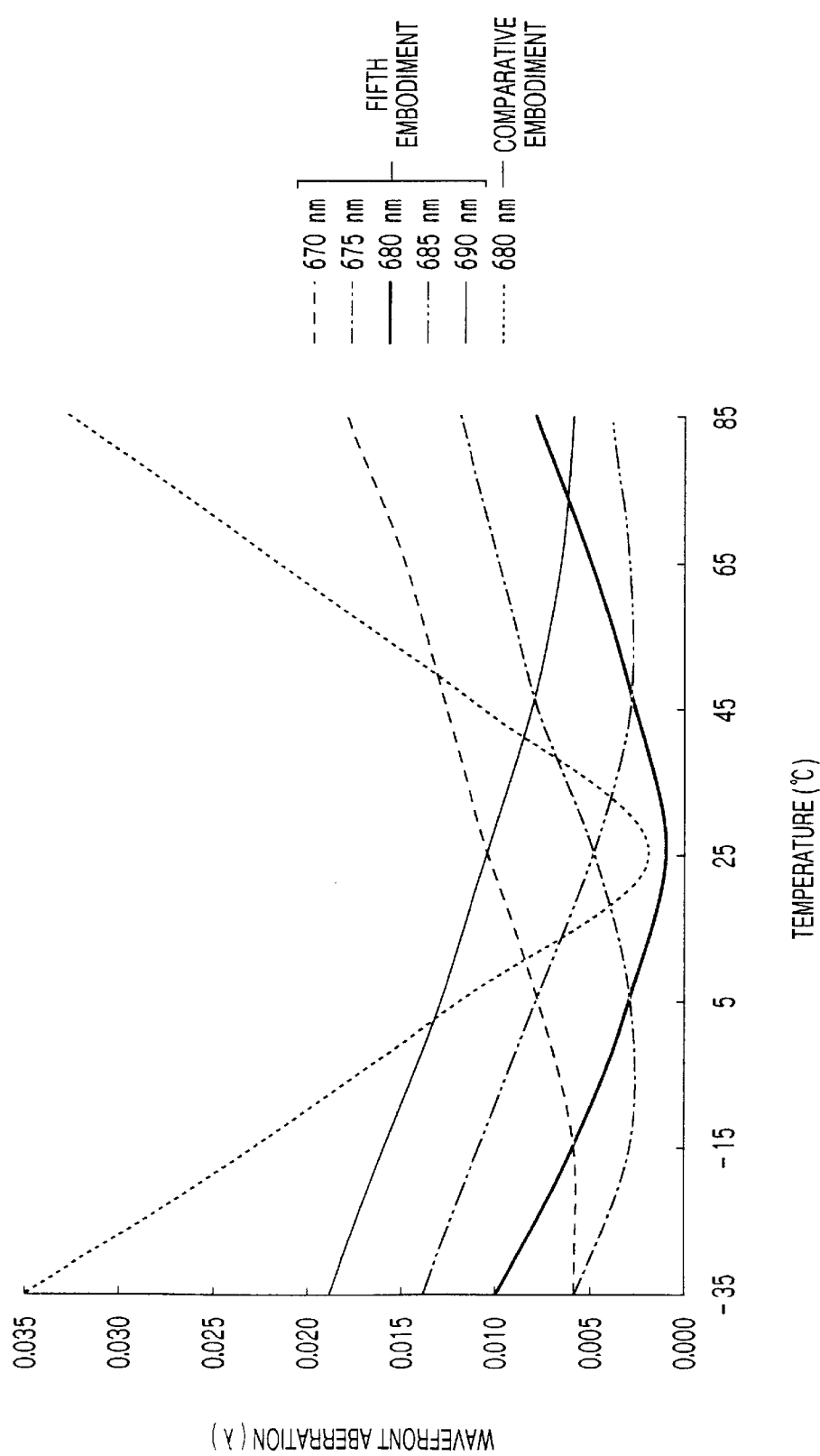
FIG. 26 is a graph showing the relationship between the wave front aberration and temperature at various wavelengths for the objective lens of the fifth embodiment.
Figure 27:
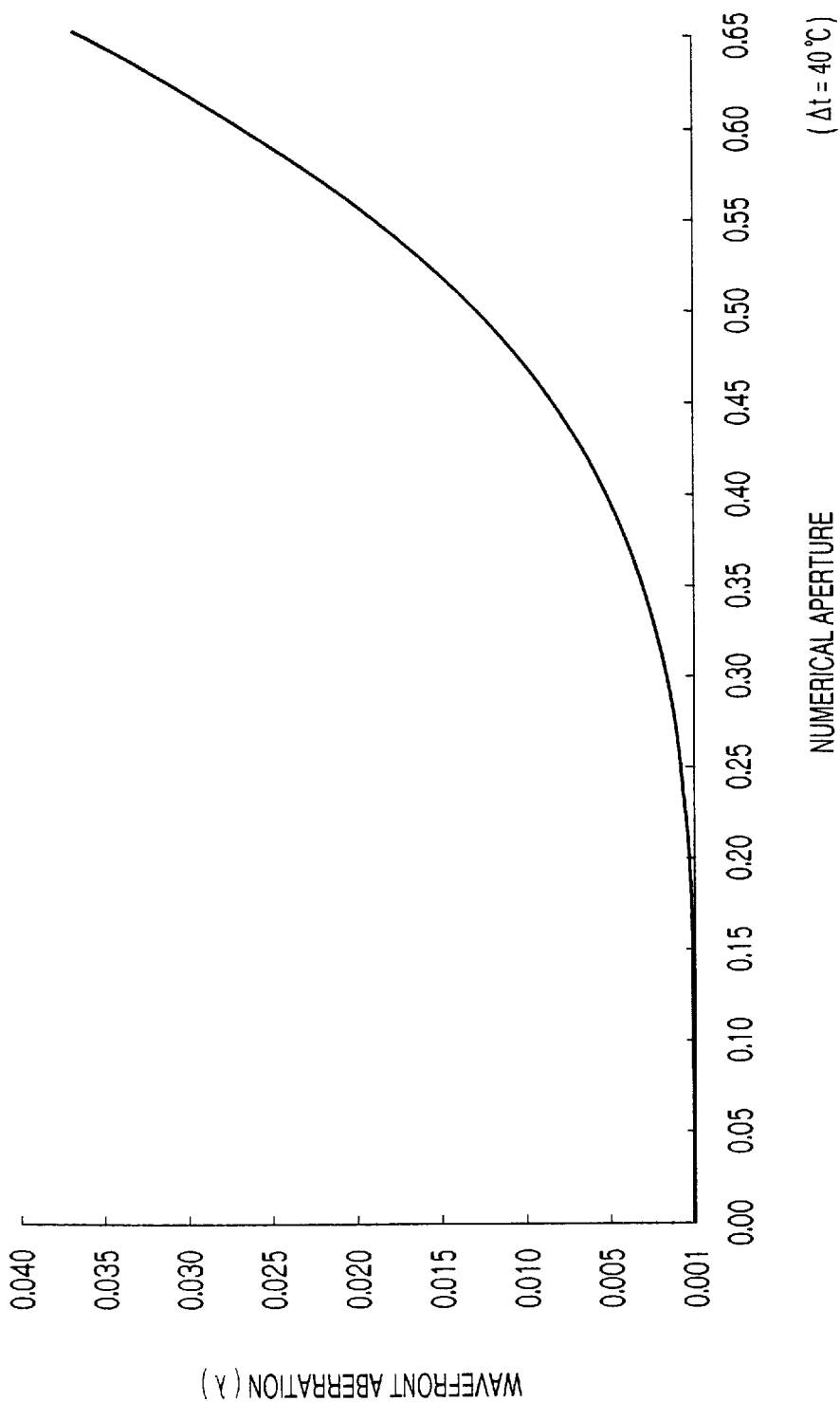
FIG. 27 is a graph showing variation of the wave front aberration of a conventional plastic objective lens of which focal length is 3.0 mm at wavelength 650 nm when temperature rises 40 degrees with respect to NA as a parameter.

FIG. 26 is a graph showing the relationship between the wave front aberration and temperature at various wavelengths for the objective lens of the fifth embodiment. The standard wavelength for the fifth embodiment is 680 nm. However, wave front aberrations for five wavelengths (670 nm, 675 nm, 680 nm, 685 nm and 690 nm) are shown in FIG. 26 allowing for individual differences of semiconductor lasers. The fine dot line shows the wave front aberration of a comparative objective lens that has a diffractive grating for compensating longitudinal chromatic aberration and for reducing change of spherical aberration due to wavelength shift. That is, the diffractive grating of the comparative object lens has no wavelength dependence in the spherical aberration.

Within the range of 25° C.±60 degrees, the wave front aberration of the comparative object lens exceeds 0.035λ, that of the fifth embodiment is lower than 0.020λ. Thus the objective lens of the embodiment has sufficient performance for the DVD apparatus or the MO apparatus that requires a strict tolerance level.

The present disclosure relates to the subject matter contained in Japanese Patent Application No. HEI 10-150361, filed on May 29, 1998, which is expressly incorporated herein by reference in its entirety.

What is claimed is:

1. An objective lens for an optical head, comprising:
    a refractive lens having a positive refractive power; and
    a diffractive grating having a plurality of concentric ring-shaped steps that are formed on at least one lens surface of said refractive lens,
    wherein said diffractive grating is configured such that spherical aberration changes in the undercorrected direction as wavelength of incident light increases.

2. The objective lens according to claim 1, wherein said refractive lens is a plastic lens.

3. The objective lens according to claim 2, wherein said refractive lens is a biconvex lens of which surfaces are aspherical.

4. The objective lens according to claim 1, wherein the following condition (1) is satisfied;

$$-75.0 < P_4 \times (h_{max})^4/(f \times NA^4) < -25.0 \quad (1)$$

where $h_{max}$ is the maximum height from the optical axis in the effective diameter, NA is numerical aperture, f is the total focal length of said refractive lens and said diffractive grating, and $P_4$ is a fourth order coefficient when an additional optical path length added by said diffractive grating is expressed by the following optical path differential function $\Phi(h)$:

$$\Phi(h) = (P_2 h^2 + P_4 h^4 + P_6 h^6 + \ldots) \times \lambda$$

where $P_2$ and $P_6$ are coefficients of second and sixth orders, h is a height from the optical axis and $\lambda$ is wavelength of incident light.

5. The objective lens according to claim 1, wherein said refractive lens and said diffractive grating have a total longitudinal chromatic aberration such that the backfocus increases as the wavelength of the incident light increases, and wherein the following condition (2) is satisfied;

$$-1 < \Delta CA/\Delta SA < 0 \quad (2)$$

where $\Delta CA$ is a movement of a paraxial focal point with wavelength shift and $\Delta SA$ is variation of spherical aberration for marginal rays with wavelength shift.

6. The objective lens according to claim 5, further satisfying the following condition (2');

$$-0.7 < \Delta CA/\Delta SA < -0.5. \quad (2')$$

7. The objective lens according to claim 2, wherein said diffractive grating has a positive paraxial power, and wherein the following condition (3) is satisfied;

$$40.0 < f_D/f < 140.0 \quad (3)$$

where f is the total focal length of said objective lens, and $f_D$ is the focal length of said diffractive grating that is defined as the following equation;

$$f_D = 1/(-P_2 \times 2\lambda)$$

where $P_2$ is a second order coefficient when an additional optical path length added by said diffractive grating is expressed by the following optical path differential function $\Phi(h)$:

$$\Phi(h) = (P_2 h^2 + P_4 h^4 + P_6 h^6 + \ldots) \times \lambda$$

where $P_4$ and $P_6$ are coefficients of fourth and sixth orders, h is a height from the optical axis and $\lambda$ is wavelength of incident light.

* * * * *